United States Patent
Baudoin et al.

(10) Patent No.: US 7,142,522 B2
(45) Date of Patent: Nov. 28, 2006

(54) DEVICE FOR MANAGING RESOURCES FOR A SATELLITE TELECOMMUNICATION SYSTEM

(75) Inventors: Cédric Baudoin, Toulouse (FR); Laurence Bignebat, Plaisance du Touch (FR); Stéphane Combes, Toulouse (FR); Pierre Parmentier, Saclay (FR); Laurent Roullet, Toulouse (FR); Tarif Zein Al-Abedeen, Castanet (FR)

(73) Assignee: Alcatel, Paris (FR)

( * ) Notice: Subject to any disclaimer, the term of this patent is extended or adjusted under 35 U.S.C. 154(b) by 916 days.

(21) Appl. No.: 09/902,752

(22) Filed: Jul. 12, 2001

(65) Prior Publication Data

US 2002/0009052 A1    Jan. 24, 2002

(30) Foreign Application Priority Data

Jul. 13, 2000    (FR)    .................................. 00 09198

(51) Int. Cl.
*H04B 7/212*    (2006.01)
(52) U.S. Cl. ................. 370/322; 370/395.43; 370/468; 455/452.1; 455/452.2
(58) Field of Classification Search ................ 370/310, 370/316, 321, 322, 323, 325
See application file for complete search history.

(56) References Cited

U.S. PATENT DOCUMENTS 6,381,228 B1 * 4/2002 Prieto et al. ................. 370/323
6,449,267 B1 * 9/2002 Connors ..................... 370/347
6,604,146 B1 * 8/2003 Rempe et al. ............... 709/238
6,625,129 B1 * 9/2003 Olds et al. ................... 370/316
6,850,497 B1 * 2/2005 Sigler et al. ................. 370/310

FOREIGN PATENT DOCUMENTS

EP    0453355 A2    4/1991

OTHER PUBLICATIONS

"Definition and Performance Analysis of a Simple, ABR-Like Congestion Control Scheme for Satellite ATM Networks with Guaranteed Loss Performance", A. Baiocchi et al. IEEE, vol. 17, No. 2 Feb. 1999.
"ATM-over-satellite demonstration of broadband network interconnection" Z. Sun et al., Computer Com-munications, 1998, pp. 1090-1101.

* cited by examiner

*Primary Examiner*—Chi Pham
*Assistant Examiner*—Thien D. Tran
(74) *Attorney, Agent, or Firm*—Sughrue Mion, PLLC

(57) ABSTRACT

A satellite telecommunication system includes a plurality of user stations and at least one satellite. A resource manager for the satellite telecommunication system includes a congestion controller that assigns resources to uplinks, a demand assignment device that assigns resources to uplinks, and, for each satellite, a central entity that includes a subsystem of the congestion controller adapted to receive requests sent by user stations using the satellite, each request expressing the bit rate necessary for a group of connections supported by a user station and by the same downlink of the satellite, and to determine the bit rate authorized for the group of connections. It further includes, for each satellite, a subsystem of the demand assignment device adapted to allocate resources to an uplink, at each user station, as a function of the bit rates authorized by the congestion controller subsystem and globally for all connections supported by the user station.

3 Claims, 5 Drawing Sheets

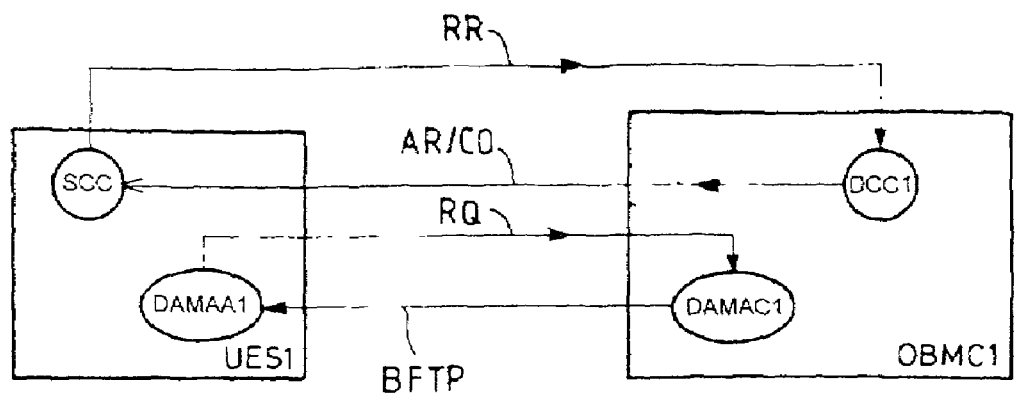
FIG_1
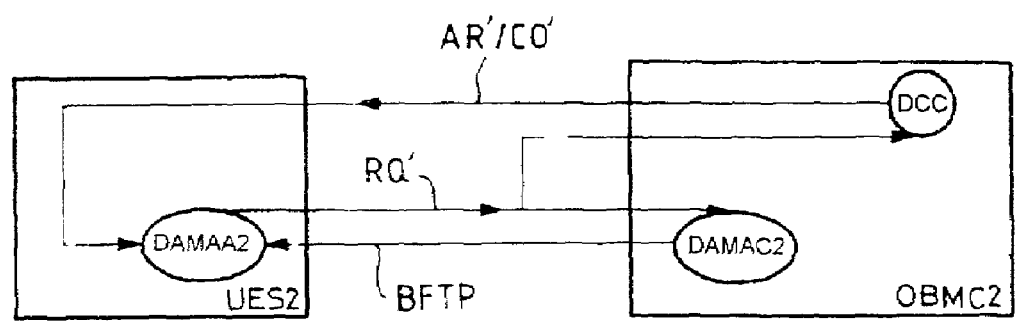
FIG_2
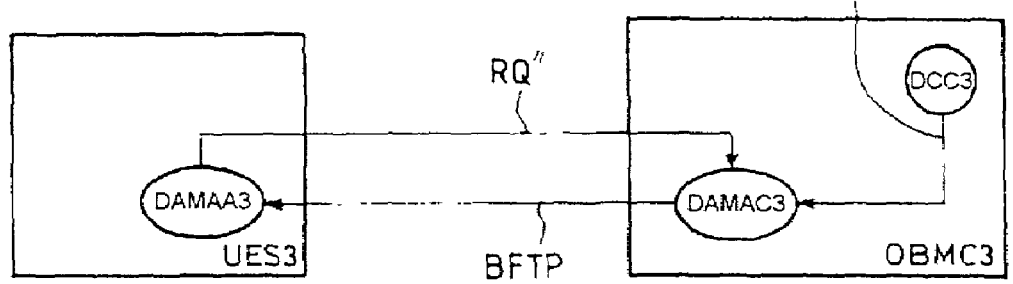
FIG_3

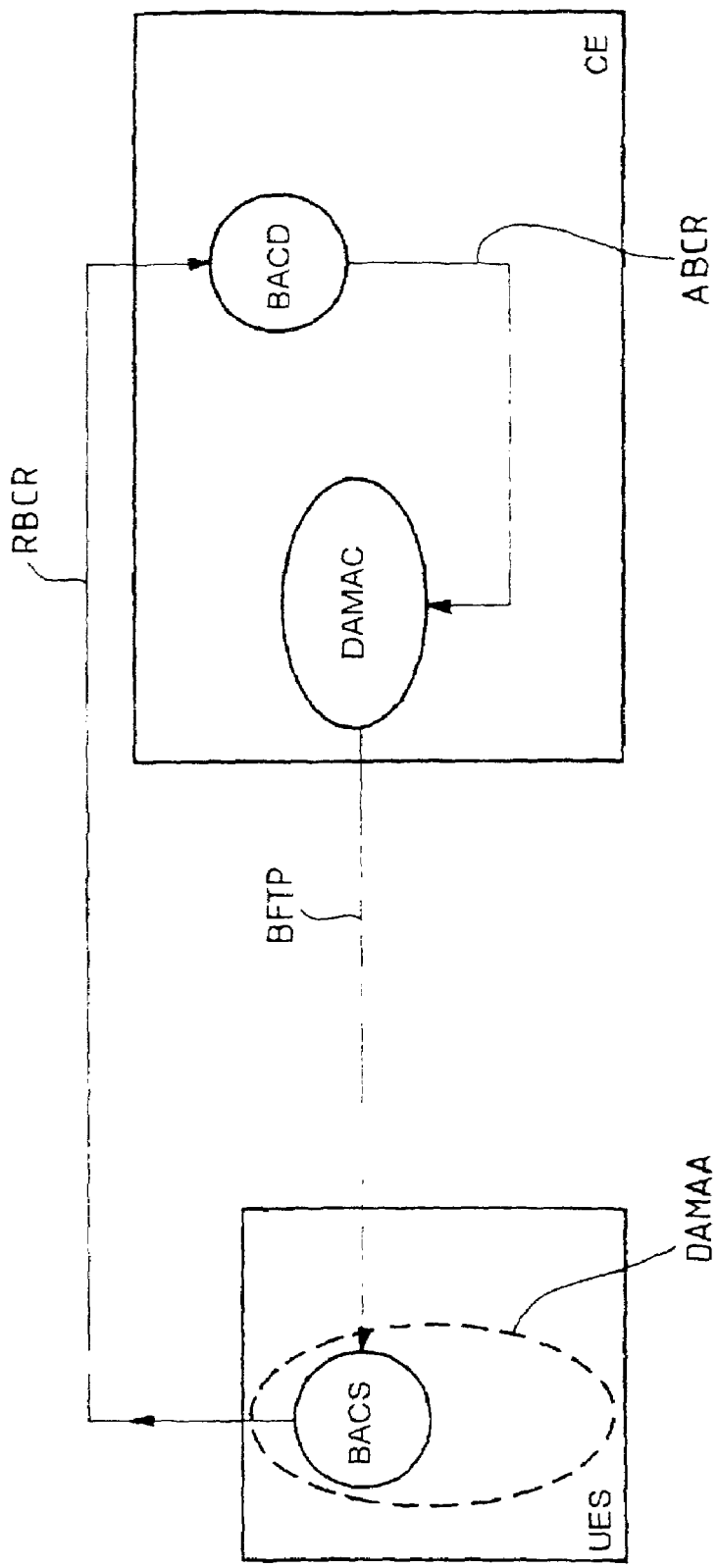
FIG_4

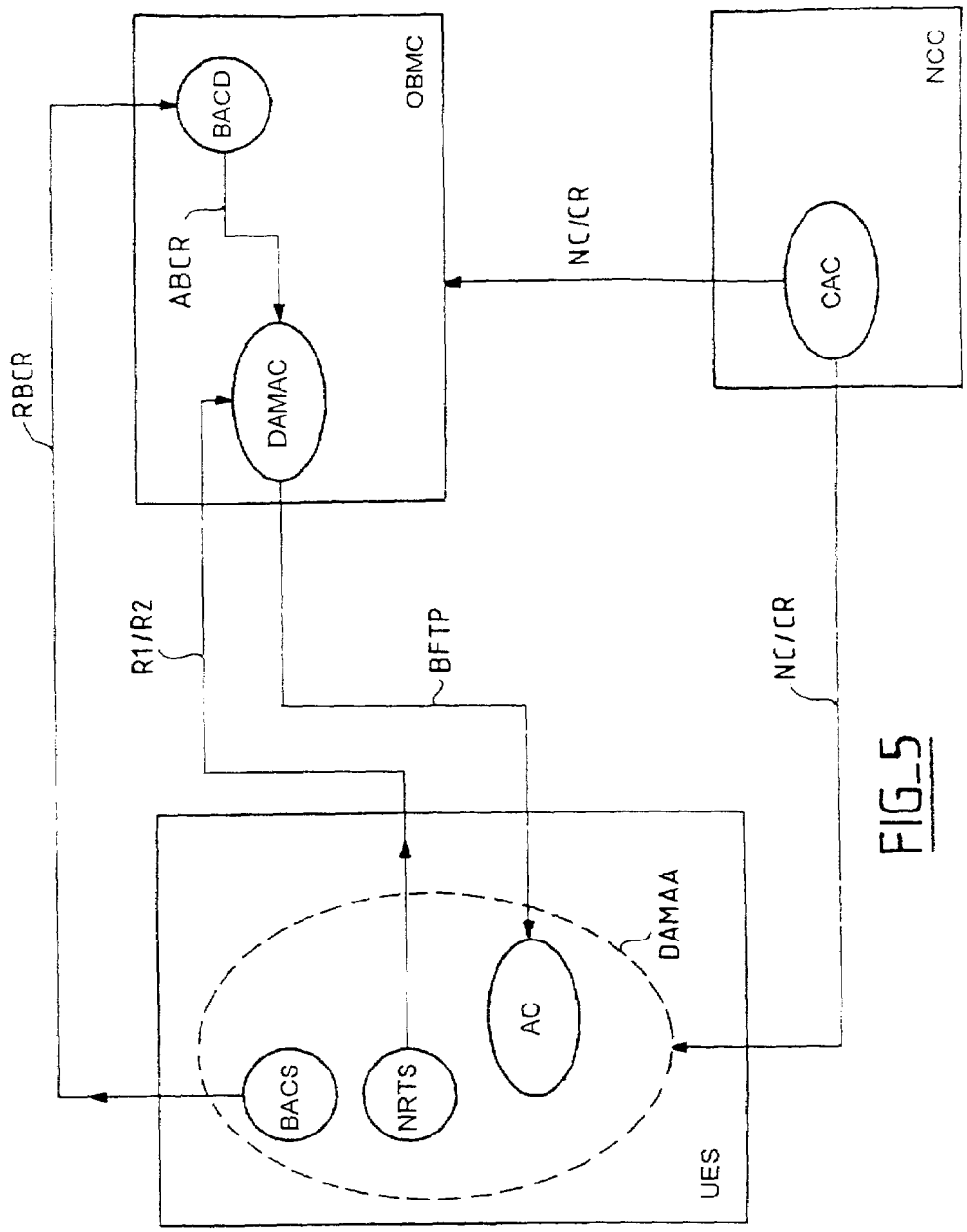
FIG_5

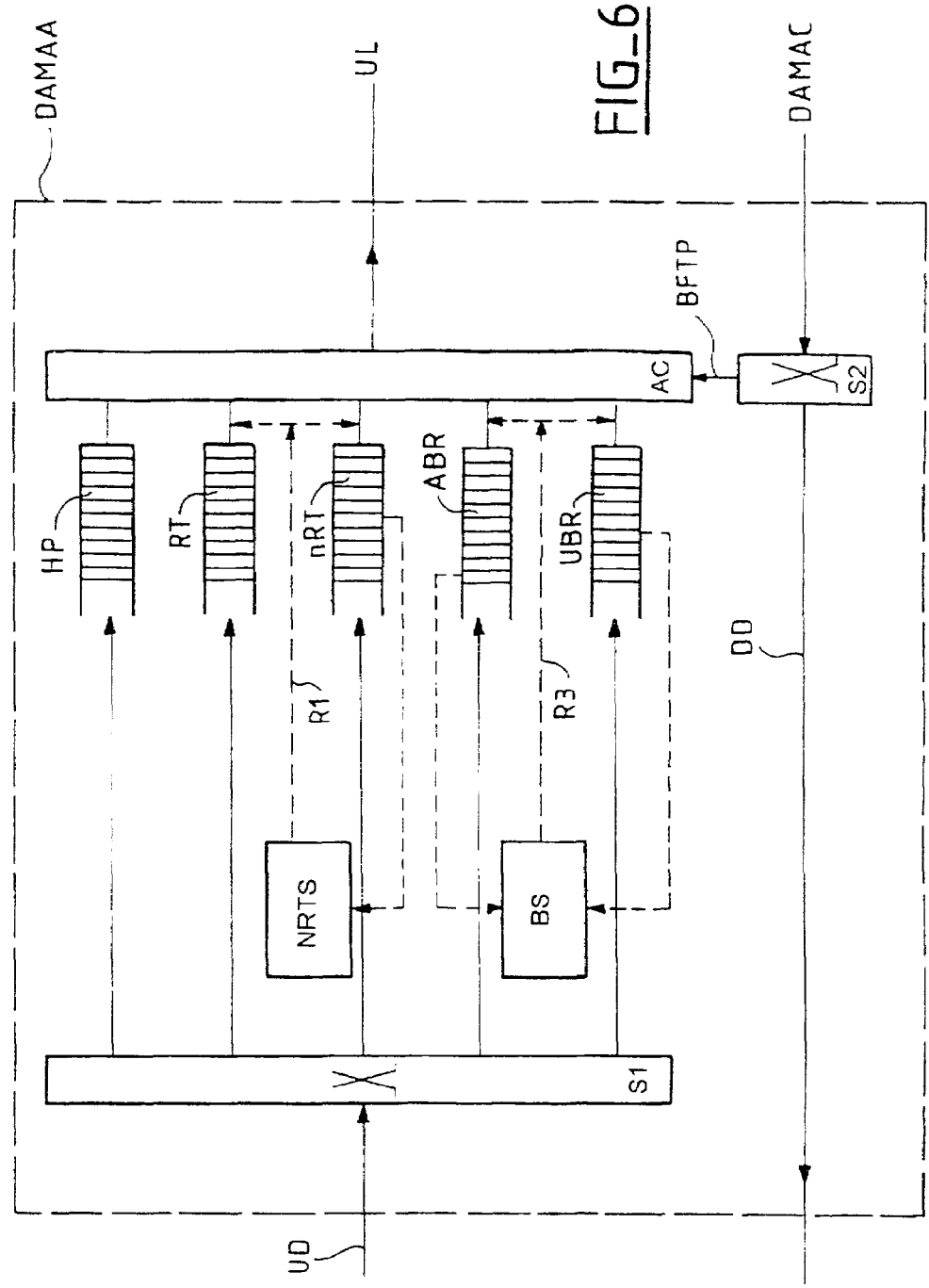

DEVICE FOR MANAGING RESOURCES FOR A SATELLITE TELECOMMUNICATION SYSTEM

CROSS-REFERENCE TO RELATED APPLICATIONS

This application is based on French Patent Application No. 00 09 198 filed Jul. 13, 2000, the disclosure of which is hereby incorporated by reference thereto in its entirety, and the priority of which is hereby claimed under 35 U.S.C. § 119.

BACKGROUND OF THE INVENTION

1. Field of the Invention

The invention relates to a resource manager for a satellite telecommunication system and in particular a system in which data is transmitted in the form of packets and is switched by a packet switch on board a satellite. The satellite can be a geosynchronous satellite or a non-geosynchronous satellite. The packets can be asynchronous transfer mode (ATM) cells, but the device can be adapted for any type of packet, of fixed or variable length.

2. Description of the Prior Art

This kind of telecommunication system includes a plurality of terrestrial stations called user stations which communicate with each other via one or more satellites. They compete to use the resources of the satellite(s). This kind of system includes a resource manager for each satellite to manage the resources of the satellite: the bandwidth of each uplink, the bandwidth of each downlink, and the resources of the onboard switch.

The onboard switch distributes data packets arriving on a plurality of uplinks to a plurality of downlinks in accordance with routing data. This kind of telecommunication system includes a system for assigning time and frequency resources to the uplinks (from user stations to the satellite). This is not enough, however: the switch performs statistical multiplexing at each of its outputs. The data packets do not generally have a constant bit rate, and are instead transmitted in the form of bursts. Conflict results if many packets have the same output as their destination at the same time (i.e. must be supported by the same downlink from the satellite to one or more user stations). The conflict is resolved by means of a buffer, and there is generally one buffer per output. The buffer has a limited capacity, however. Buffer congestion leads to the loss of data packets.

To minimize the loss of packets, this kind of system includes a congestion controller which operates on the user station sending the packets to slow down the flow of packets dynamically during transmission. This kind of system further includes a connection admission controller which accepts the setting up of a new connection only if sufficient resources are available at the time in question. The set of these devices constitutes a satellite resource manager. The set of devices can be on the ground or divided between the ground and the satellite.

This kind of resource manager must satisfy the following constraints:

It must optimize the use of uplink and downlink radio resources.

It must guarantee an acceptable loss rate in the onboard switch, especially if it has only a low buffer capacity.

It must limit the complexity of the control elements of the onboard switch.

It must offer maximum flexibility and reconfigurability.

It must be able to support a very broad and constantly changing spectrum of traffic types.

It must be able to offer and guarantee different qualities of service.

It must remain coherent with the principles and standards relating to the ATM layer, the resource management protocol being located in the medium access control (MAC) layer between the ATM layer and the physical layer.

Using a demand assignment multiple access (DAMA) protocol in the resource manager to optimize the use of the radio resources of a satellite with no onboard switch is known in the art. In conjunction with a connection admission controller (CAC), a DAMA controller assigns the user stations respective frequencies and time slots on an uplink (and the associated downlink) as a function of demand expressed explicitly or implicitly by the stations. Requests from all the stations using a given satellite are sent to the DAMA controller managing the resources of that satellite and are serviced on a "first come, first served" basis. Several DAMA protocols are known in the art that differ in terms of the algorithms used to perform the demand assignment.

For example, the document "Quality-of-service-oriented protocols of resource management in packet switched satellite", EMS Technologies, 4th Ka band utilization conference, 1998, describes a DAMA type protocol known as the combined free and demand assignment multiple access (CFDAMA) protocol, which manages resources by splitting them into four parts:

A reserved part (constantly assigned) which requires no requests and which is used for all types of traffic at a constant bit rate or that are not able to tolerate the latency time associated with dynamic assignment (constant bit rate (CBR) traffic) or variable bit rate real time (VBRrt) traffic).

A rate-based dynamic capacity (RBDC) part which operates in accordance with a request/assignment principle, requests being expressed in terms of bit rate.

A volume-based dynamic capacity (VBDC) part which operates in accordance with a request/assignment principle, requests being expressed in terms of volume.

A free part which consists of the remaining capacity after the foregoing capacities have been assigned.

The latter three mechanisms can be applied to non-real-time traffic, able to tolerate longer delays than the first mechanism.

In the case of a satellite including a packet switch, it is not sufficient to manage the resources of the uplinks and downlinks, and it is further necessary to adapt the access protocol to perform congestion control, because unless this can be achieved it is necessary to increase the buffer capacity or to tolerate a high rate of loss of packets due to congestion in the buffers of the onboard switch.

A first prior art manager, shown in FIG. 1, controls congestion independently of the resource assignment protocol. The prior art device includes a central unit OBMC1 which combines a DAMA resource assignment controller DAMAC1 and a first subsystem DCC1 of the congestion controller. These controllers are on board the satellite, but they could be grouped with the connection admission controller in a central ground station.

In the device shown in FIG. 1, the user station UES1 includes a DAMA agent DAMAA1 and a second subsystem SCC of the congestion controller.

Knowing that it requires a given bit rate, the subsystem SCC sends the subsystem DCC1 of the congestion controller a request RR indicating the required bit rate. The subsystem DCC1 responds by indicating an authorized bit rate AR or sends a refusal CO if the buffer for the target output is congested. Independently of this, the agent DAMAA1 sends the controller DAMAC1 a request RQ for the assignment of certain resources. The controller DAMAC1 responds with a resource assignment message (burst frequency time plan—BFTP).

The assignment controller DAMAC1 maximizes the uplink load. The congestion controller subsystem DCC1 minimizes congestion of the buffers of the onboard switch (not shown) by limiting the arrival of traffic at the MAC layer of the station UES1 (for example by using conventional flow control). It therefore contributes indirectly to modulating resource assignment requests sent by the agent DAMAA1, but a consequence of the asynchronous operation of the assignment controller DAMAC1 and the congestion controller subsystem DCC1 is that the capacity of the resources assigned by the assignment controller DAMAC1 does not always match that authorized by the congestion controller subsystem DCC1. This solution is therefore somewhat ineffective and requires buffers of high capacity in the onboard switch.

FIG. 2 shows a second prior art manager. In this device, the congestion controller includes a single subsystem DCC2 in the central entity OMBC2 on board the satellite and the user station UES2 no longer includes any subsystem SCC. Requests RQ' from the assignment agent DAMAA2 are sent to the assignment controller DAMAC2 and to the congestion controller DCC2. The assignment controller DAMAC2 sends assignment messages BFTP to the agent DAMAA2. The congestion controller DCC2 responds to the agent DAMAA2 by indicating an authorized bit rate AR' or a refusal CO' if the buffer for the target output is congested. The information from the congestion controller DCC2 is therefore interpreted directly by the agent DAMAA2 in the medium access control layer MAC of the user station UES2. Using this information, the agent DAMAA2 sends assignment requests RQ' which are modulated to take into account the congestion of each downlink the agent wants to use. This maximizes the use of each uplink, in contrast to the solution previously described.

FIG. 3 shows a third prior art device. In this device, as in the second device, the user station UES3 no longer includes any congestion controller subsystem SCC. Requests RQ" from the assignment controller DAMAC3 are sent only to the assignment controller DAMAC3 in the central entity OBMC3 on board the satellite. The assignment controller DAMAC3 sends assignment messages BFTP to the agent DAMAA3. The congestion controller DCC3 sends the controller DAMAC3 a message indicating an authorized bit rate AR" or a refusal CO" if the buffer for the target output is congested. These messages are interpreted directly by the controller DAMAC3, which takes account of them when allocating resources to the station UES3. The reaction time of this prior art device is shorter than those of the two devices previously described, since the action of the congestion controller DCC3 is not subject to the time-delay introduced by a satellite-Earth-satellite round trip.

The second prior art device can use alternately two types of congestion control algorithm known as "available bit rate" algorithms:

An explicit rate indication for congestion avoidance (ERICA) algorithm controls the bit rate connection by connection, using dedicated packets to transmit requests or indications.

A broadcast rate assignment (BRCA) algorithm, which is a simplified variant of the previous algorithm, and controls congestion for an uplink/downlink pair, instead of connection by connection.

The ERICA algorithm is applicable only to the first and second prior art devices (FIGS. 1 and 2).

The second and third devices are better than the first device, but nevertheless have various defects:

Great complexity (because the filling of the buffers of the onboard switch must be monitored continuously to detect congestion).

A buffer memory of at least moderate size, because congestion control can only react after detecting the onset of congestion.

The connection by connection processing of the ERICA algorithm generates a high signaling load (dedicated packets), which is added to the signaling load generated by the assignment controller DAMAC.

The uplink/downlink pair processing of the BRCA algorithm rules out equitable sharing of resources, user station by user station, because it does not take account of their specific requirements.

They can be implemented only on board the satellite, because it is necessary to monitor the filling of the buffers and to obtain a shorter reaction time.

Moreover, in the implementation of the first and second devices (using the ERICA algorithm), only available bit rate (ABR) traffic is subject to congestion control. All other traffic, even bursty non-real-time traffic, is exempted from congestion control, for example variable bit rate, non-real-time (VBR-nRT) ATM traffic, guaranteed frame rate (GFR) ATM traffic, unspecified bit rate (UBR) ATM traffic.

This imposes heavy constraints on the size of the buffers needed in the onboard switch, for example:

a memory of moderate capacity dedicated to VBR-nRT traffic is required for each output to reduce the equivalent bandwidth of a VBR-nRT connection (calculated by the connection admission controller and representative of the bandwidth to be reserved on the downlink in question).

to absorb the uncontrolled arrival of GFR or UBR traffic bursts, a high-capacity memory dedicated to this traffic is required for each output.

An object of the invention is to propose a manager that does not suffer from the above drawbacks of the prior art managers.

SUMMARY OF THE INVENTION

The invention provides a resource manager for a satellite telecommunication system including a plurality of user stations and at least one satellite, the manager including a congestion controller that assigns resources to downlinks, a demand assignment device that assigns resources to uplinks, and, for each satellite, a central entity that includes:

a subsystem of the congestion controller adapted to:
receive requests sent by user stations of the satellite, each request expressing the bit rate necessary for a group of connections supported by a user station and by the same downlink of the satellite, and
determine the bit rate authorized for the group of connections, and a subsystem of the demand assignment device adapted to allocate resources to an uplink, at each user station, as a function of the bit rates authorized by the subsystem of the congestion controller and globally for all connections supported by the user station.

The above manager enables smaller buffers to be used because it reacts preventatively to the risk of congestion, i.e. well before the onset of congestion, thanks to the fact that the congestion controller itself receives the bit rate assignment requests, instead of the DAMA controller receiving them, waiting passively for congestion to manifest itself, and then reacting to congestion that has already started.

The above manager is compatible with all known DAMA algorithms. It is simpler to implement than the prior art managers and it can be installed entirely on the ground, if necessary, because there is no need to monitor the filling of the buffers of the switch on board the satellite.

It can be used for all non-real-time traffic, predictable or otherwise, in particular ABR, GFR and UBR traffic, including VBRnRT traffic.

In one preferred embodiment, for each user station, the subsystem of the demand assignment device situated in the central unit is adapted to:

receive a request for assignment of additional bit rate, sent by a user station when it detects violation of a filling threshold of a buffer for variable bit rate nonreal-time traffic when it has been assigned a minimum bit rate, send the station bit rate assignment messages authorizing a higher bit rate, receive from the station a request indicating that the filling has begun to decrease and indicating the filling level, determine by anticipation the time at which the filling will be zero, and deduce therefrom a time at which it will be able to send the station a bit rate assignment message again allocating the minimum bit rate, the time being chosen so that the message reaches the station at a time close to the time at which the filling will be zero.

The above manager uses an anticipated assignment mechanism which optimizes the assignment of resources for the non-real-time traffic that is well characterized.

The invention will be better understood and other features of the invention will become apparent in the course of the following description and from the accompanying drawings. The description relates to ATM cells and types of service defined in the ATM standards, but the resource manager in accordance with the invention can be used for all types of packet.

BRIEF DESCRIPTION OF THE DRAWINGS

FIG. 1 is a block diagram of the first prior art device described hereinabove.

FIG. 2 is a block diagram of the second prior art device described hereinabove.

FIG. 3 is a block diagram of the third prior art device described hereinabove.

FIG. 4 is a block diagram of one embodiment of a resource manager in accordance with the invention, showing only what is essential for preventative congestion control.

FIG. 5 is a more detailed block diagram of the same embodiment of a resource manager in accordance with the invention, also showing what is essential for a DAMA access protocol with an anticipated assignment mechanism for some traffic.

FIG. 6 is a block diagram of one embodiment of a DAMA agent in the case of a user station as shown by way of example in FIGS. 4 and 5.

DETAILED DESCRIPTION OF THE PREFERRED EMBODIMENTS

Figure 7:
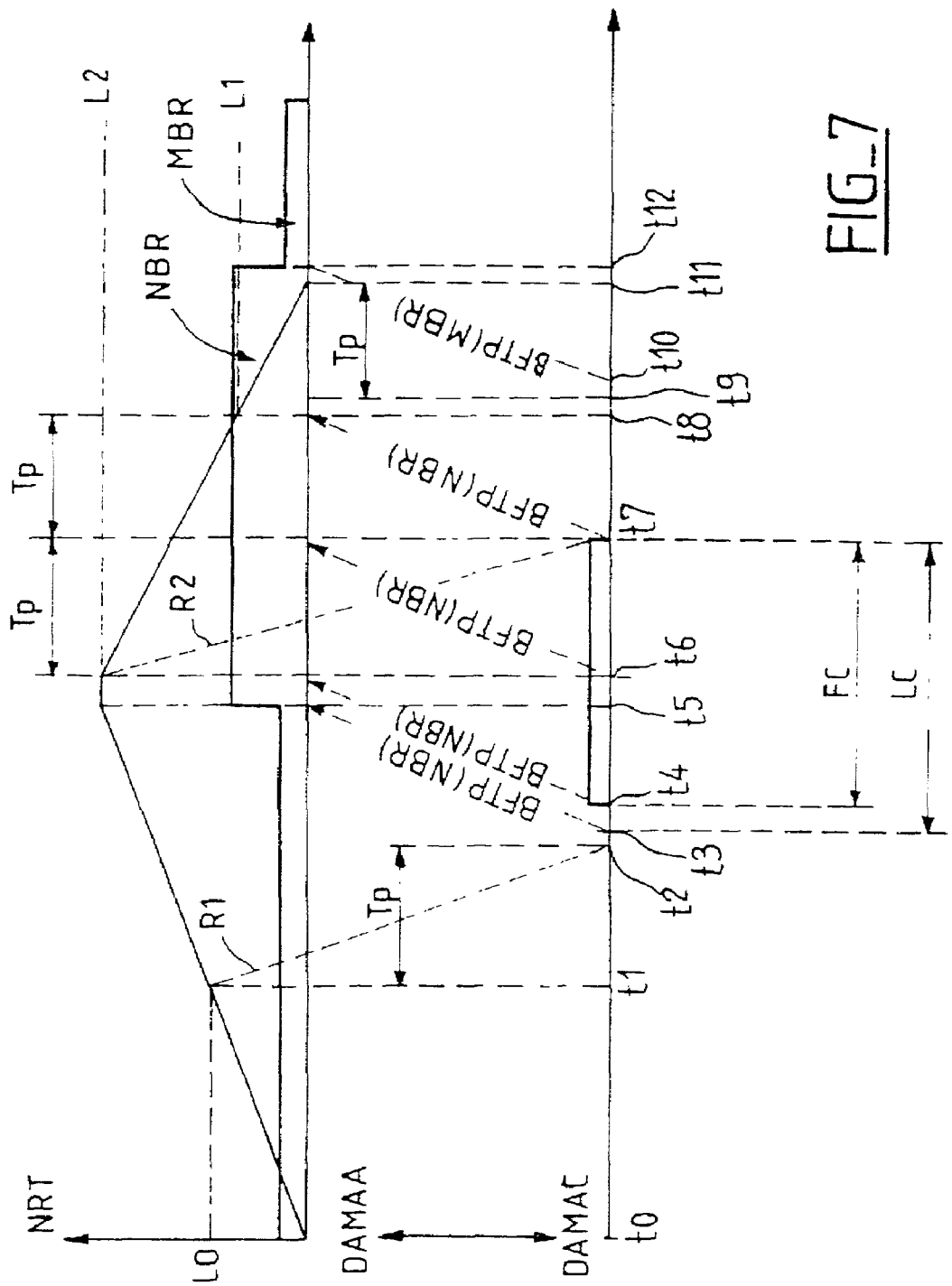
FIG. 7 is a timing diagram showing how the DAMA agent allocates resources to an uplink, in an anticipated manner, for variable bit rate non-real-time (VBRnRT) traffic.

FIG. 4 is a block diagram of one embodiment of a resource manager in accordance with the invention, showing only what is essential for preventative congestion control. The manager includes:

a part specific to each user station UES, and situated in that station, and a central entity CE common to all the stations (i.e. common to all the links between a given satellite and user stations), or common to a subset of stations (access providers or network providers).

In a first embodiment, the central entity CE is on board the satellite. In a second embodiment, the central entity CE is on the ground, for example in one of the user stations, or it can be distributed between a plurality of control stations. The operating principle is unchanged. The embodiment located on the ground has the advantage of reducing the payload of the satellite but the drawback of requiring additional signaling messages between the ground and the satellite.

In both embodiments the call control functions and the call admission control (CAC) functions are implemented in a common center on the ground. They can also be dispersed to different access providers if there is more than one access provider for the same satellite.

Each user station UES includes a DAMA agent DAMAA modified in accordance with the invention and which includes a device BACS which is a first subsystem of a device referred to as a block admission controller. The central entity CE includes a DAMA controller DAMAC and a second subsystem BACD of the block admission controller. The main function of the controller DAMAA and the client DAMAAC is managing uplink resources. A further function of the two subsystems BACS and BACD of the block admission controller is to manage downlink resources and to minimize congestion at the outputs of the onboard switch.

The subsystem BACS sends bit rate assignment requests RBCR representing the cumulative requirements for each downlink, for the given station UES, as a function of the incoming traffic at that station UES. Each assignment request RBCR therefore corresponds to a group of connections passing through that station UES and the same output of the onboard switch, rather than a connection considered individually or to a downlink considered globally.

The subsystem BACD receives bit rate assignment requests RBCR sent by each station UES. The subsystem BACD uses those requests directly to determine an authorized bit rate for each connection group and for each output of the onboard switch, allowing for the respective maximum permitted bit rate at each of those outputs. As in the third prior art device described above, the subsystem BACD is connected directly to the controller DAMAC. However, this direct link is used to indicate to the controller an authorized bit rate ABCR for each connection group and for each output of the onboard switch. The controller DAMAC deduces from this information the bit rate that it can assign to each group of connections for each uplink. It periodically sends a time and frequency assignment message BFTP to each station UES to indicate to it the bit rate assigned for each group of connections on the uplink connecting it to the satellite.

The direct link between the subsystem BACD and the controller DAMAC makes congestion control insensitive to transmission time-delays between the central entity CE and the stations: it enables the bit rates assigned by the controller DAMAC to be modulated with no delay, and therefore with the optimum reactivity. Also, the fact that the bit rate assignment requests RBCR are processed by the subsystem BACD to modulate the bit rates that it authorizes matches the uplink and downlink resource management, which is therefore made more efficient in both cases.

In the station UES, the agent DAMAA receives from the central entity CE a bit rate assignment message BFTP for the uplink used by the station UES. The assignment of time and frequency resources on an uplink is calculated by the controller DAMAC as a function of the bit rate authorized by the subsystem BACD. The authorized bit rates are determined with a view to avoiding congestion, and the resources assigned on the uplinks consequently prevent congestion. This dynamic and preventative congestion control complements the static congestion control applied when each connection is set up. Finally, it enables smaller buffers to be used for a given rate of loss of packets.

The different types of traffic to be managed are as follows:

High-priority traffic and real-time traffic, which is not subjected to congestion control because there is no question of extending the transmission time. Preventative call admission control (CAC) is sufficient.

Non-real-time traffic, which can withstand increased transmission time-delays and is relatively well characterized (by means of a bit rate value referred to as "sustainable") when it is predictable, which enables the use of an anticipated congestion control mechanism for call admission control (CAC), described below. The BAC congestion control mechanism can equally be applied to it.

Non-real-time and non-predictable traffic (ABR, UBR, GFR traffic), which can withstand an increase in transmission time-delays and is therefore subjected to congestion control, but does not benefit from the anticipated congestion control mechanism, because it is not well characterized.

The resources for each downlink are assigned by the block admission controller BACS-BACD, which divides them into three parts:

One part of the resources is reserved continuously for well-characterized traffic, and this part is therefore not affected by the congestion control applied by the controller BACD. It is determined when each connection is set up or cleared down, and is equal to the sum of the equivalent bands calculated by the connection admission controller CAC and necessary to guarantee the following bit rates:

peak bit rate (PCR) of real-time connections, sustained bit rates (SCR) of non-real-time connections, if the congestion control mechanism BAC is not applied to them, and minimum bit rates (MCR), if any, guaranteed for other types of traffic (ABR, GFR, UBR, etc. traffic).

One part is the sum of all the bit rates authorized dynamically by the controller BACD.

The remaining part, if any, is equitably distributed between the uplinks by the controller BACD.

FIG. 5 is a more detailed block diagram of this embodiment of the resource manager in accordance with the invention. The central entity is an onboard multimedia controller (OBMC) on board the satellite. Compared to FIG. 4, FIG. 5 additionally shows, in the block diagram of the agent DAMAA, a signaling device NRTS dedicated to non-real-time traffic and an uplink access controller AC for the uplink connecting the user station UES to the satellite. It also shows the call admission controller CAC which is on the ground in a center NCC (as indicated above, the central entity could be on the ground and integrated into the center NCC in different embodiments).

The controller CAC advises the access controller AC of each user station UES and the subsystem BACD (which is on board the satellite in this example) by means of messages NC/CR at the time each connection is set up and cleared down. The signaling device NRTS manages the non-real-time traffic by sending bit rate assignment requests R1 and bit rate release messages R2 if a bit rate requested by a preceding bit rate assignment request is no longer justified (i.e. at the end of a burst of data packets).

FIG. 6 is a more detailed block diagram of the agent DAMAA in the user station UES shown by way of example in FIGS. 4 and 5. The agent DAMAA includes:

a first-in-first-out memory HP for storing high-priority traffic cells waiting to be sent to the satellite, a first-in-first-out memory RT for storing real-time traffic cells waiting to be sent to the satellite, a first-in-first-out memory nRT for storing non-real-time traffic cells waiting to be sent to the satellite, a first-in-first-out memory ABR for storing available-bit-rate traffic (traffic supplied by a source whose bit rate can be modulated at any time by the transmission network as a function of the available resources) waiting to be sent to the satellite, a first-in-first-out memory UBR for storing unspecified-bit-rate traffic (traffic to be transmitted as best as may be as a function of remaining available resources) waiting to be sent to the satellite, a switch S1, which receives the uplink cells and distributes them into the memories HP, RT, nRT, ABR and UBR in accordance with the respective type of traffic to which they belong, the access controller AC, which reads the uplink cells in the memories HP, RT, nRT, ABR and UBR in a fixed decreasing priority order (HP, RT, nRT, ABR, UBR) and as a function of the bit rate assignments contained in the messages BFTP sent by the controller DAMAC, and then time-division and frequency-division multiplexes them onto the uplink UL, a switch S2, which receives downlink cells and extracts the BFTP messages, which are supplied to the access controller AC, and the payload DD, which is sent to a terrestrial transmission network, the signaling device NRTS dedicated to non-real-time traffic, which monitors the filling of the memory NRT and sends a signaling message R1 requesting a bit rate that is a function of the level of filling via the access controller AC, and a signaling device BS dedicated to non-real-time and non-predictive traffic (available bit rate traffic and unspecified bit rate traffic), which monitors the filling of the memories UBR and ABR and sends a signaling message R3 requesting a bit rate as a function of the filling levels, that message being routed via the access controller AC.

In a preferred embodiment of the resource manager according to the invention, the assignment of resources to an uplink is anticipated for variable bit rate non-real-time traffic, exploiting the fact that that traffic is well characterized.

FIG. 7 is a timing diagram illustrating the operation of the means for anticipated assignment of uplink resources for the variable bit rate non-real-time traffic. The top part shows the level of filling of the memory NRT of the agent DAMAA and the transmission bit rate of the data read in that memory. The bottom part shows the sequence of messages exchanged between the subsystems DAMAA and DAMAC as a function of time. For clarity, not all of the messages BFTP are shown. In fact they are sent periodically by the controller DAMAC.

From time t0, the station UES receives a burst of cells to be transmitted. At time t0 the assigned bit rate has a value MBR which is the minimum value for the uplink concerned and is less than the bit rate of the burst.

At time t1 the level of filling of the memory NRT exceeds a fixed threshold L0 because the memory receives more cells than it outputs. The signaling device NRTS then sends a request R1 that does not contain any precise bit rate information but which signals a requirement for additional bit rate. The request can be included in the header of a data cell or in a DAMA protocol signaling cell. Because the transmission time-delay Tp is not negligible, the threshold L0 is defined so that the available capacity of the memory NRT will not become saturated during the round trip time 2Tp if the burst continues.

At time t2 the request R1 reaches the controller DAMAC, which is on board the satellite in this example.

At time t3 the controller DAMAC sends a message BFTP(NBR) allocating a new bit rate NBR, higher than the bit rate NBR, the authorized bit rate increase being equal to the difference between the peak value and the sustainable value for the nonreal-time connection having the highest peak value for the station UES concerned.

The controller DAMAC will periodically send the same message BFTP(NBR) allocating the same bit rate NBR, until such time as it receives a request R2 requesting a bit rate reduction from the agent DAMAA of the user station.

At time t3 the controller DAMAC starts a counter LC which counts the number of times that it assigns the new bit rate NBR, in other words it determines the time that has elapsed since time t3. It counts as far as a time t6 at which the controller DAMAC receives a request R2 requesting a bit rate reduction. If the propagation time Tp were zero, measuring the elapsed time would enable the controller DAMAC to find out directly the numbers of cells transmitted at the new bit rate NBR. However, because of the propagation time-delays, transmission with the new bit rate NBR does not start at time t3, but at a time t5, and does not finish when the controller DAMAC assigns again the bit rate MBR lower than the bit rate NBR. Knowing the time-delay Tp, it will be possible to deduce from it the number of cells that have been sent with this bit rate, from time t5 at which the station UES will have received the first message BFTP (NBR) allocating the new bit rate NBR.

At a time t4 the controller DAMAC sends a second message BFTP(NBR) allocating the new bit rate NBR again and starts a counter FC. The determination of time t4 will be described below, in relation to time t7.

After time t5, the transmission bit rate increasing, the filling stabilizes or decreases slowly.

The burst ends at a time t6. The agent DAMAA of the user station notes the end of the burst. It then sends a request R2 requesting a reduction of the assigned bit rate, indicating the new filling level: L2.

At time t7, the controller DAMAC receives the request R2. It stops the counters FC and LC, but continues to send assignment messages BFTP(NBR) allocating the new bit rate for some time in order to empty the memory NRT completely or almost completely. To determine this time it calculates:

the time of the end of the burst, $t6=t7-Tp$, the time $t8=t7+Tp$ at which the message BFTP(NBR) sent at time t7 will reach the user station, and the filling level L1 that will be reached when the message BFTP(NBR) sent at time t7 reaches the user station at time t8.

This level can be calculated from the known filling level L2 and from what has been assigned between t7 and t7, minus the anticipation period, which is 2Tp at the most. Accordingly, in this example, the anticipation period runs from $t4=t7-2Tp$ to t7. A counter FC indicates the anticipation period, which could be less than 2Tp if two R2 messages were to arrive at the controller DAMAC within a period of less than 2Tp. This counter is reset to zero each time that the controller DAMAC has finished servicing a burst, which makes it possible to discern a plurality of bursts that are not discontinuous in time for a given station.

In this example, the calculated filling level L1 is less than the filling level L0, but not negligible. Knowing the filling level L1, the controller DAMAC deduces from it that it must maintain the bit rate NBR until a time t11 to empty the memory completely. It calculates t11 and deduces from it the time $t9=t11-Tp$ from which it can send a first message BFTP(MBR) again allocating the bit rate MBR which is less than the bit rate NBR, knowing that it must comply with the periodicity for sending messages BFTP. While waiting for time t9, it continues to send periodically messages BFTP (NBR) allocating the bit rate NBR. As soon as time t9 is reached, it waits for the next time t10 at which it must send a message BFTP and then sends a first message BFTP (MBR). The message reaches the station at a time t12 after time t11 at which the filling level is zero, but close to time t11.

There is claimed:

1. A resource manager for a satellite telecommunication system including a plurality of user stations and at least one satellite, said resource manager including a congestion controller that assigns resources to downlinks, a demand assignment device that assigns resources to uplinks, and, for each satellite, a central entity that includes:

a subsystem of said congestion controller adapted to:

receive requests sent by user stations of said satellite, each request expressing the bit rate necessary for a group of connections supported by a user station and by the same downlink of said satellite, and determine the bit rate authorized for said group of connections, and a subsystem of said demand assignment device adapted to allocate resources to an uplink, at each user station, as a function of said bit rates authorized by said subsystem of said congestion controller and globally for all connections supported by said user station.

2. The manager claimed in claim 1 wherein said subsystem of said demand assignment device is adapted to:

receive a request for assignment of additional bit rate, sent by a user station when it detects violation of a filling threshold of a buffer for variable bit rate non-real-time traffic when it has been assigned a minimum bit rate, send said station bit rate assignment messages authorizing a higher bit rate, receive from said station a request indicating that said filling has begun to decrease and indicating the filling level, determine by anticipation the time at which said filling will be zero, and deduce therefrom a time at which it will be able to send said station a bit rate assignment message again allocating said minimum bit rate, said time being chosen so that said message reaches said station at a time close to the time at which said filling will be zero.

3. The manager claimed in claim 1, wherein said subsystem of said demand assignment device is adapted to allocate resources to said downlinks on demand so that the sum of the bit rates assigned to the various connections supported by the same downlink is always less than the maximum bit rate permitted for said link, to prevent congestion on said downlinks.

* * * * *